United States Patent [19]
Jambor et al.

[11] Patent Number: 5,224,735
[45] Date of Patent: Jul. 6, 1993

[54] MOTOR VEHICLE ROLLOVER PROTECTION DEVICE

[75] Inventors: Arno Jambor, Vaihingen/Enz; Peter Seifert, Weil der Stadt, both of Fed. Rep. of Germany

[73] Assignee: Mercedes-Benz AG, Fed. Rep. of Germany

[21] Appl. No.: 850,708

[22] Filed: Mar. 13, 1992

[30] Foreign Application Priority Data

Mar. 14, 1991 [DE] Fed. Rep. of Germany ....... 4108189

[51] Int. Cl.⁵ .............................................. B60R 21/13
[52] U.S. Cl. .................................................. 280/756
[58] Field of Search ........................... 280/756, 753; 296/146 L, 146 N, 188, 99.1

[56] References Cited

U.S. PATENT DOCUMENTS

| | | | |
|---|---|---|---|
| 1,291,496 | 1/1919 | Hardie | 280/756 |
| 3,244,251 | 4/1966 | Duncan | 280/756 |
| 3,622,177 | 11/1971 | Notestine | 280/756 |
| 4,557,502 | 12/1985 | Scaduto et al. | 280/756 |
| 4,784,428 | 11/1988 | Moy | 296/146 L |

FOREIGN PATENT DOCUMENTS

| | | |
|---|---|---|
| 3427537 | 7/1984 | Fed. Rep. of Germany . |
| 3723378 | 1/1989 | Fed. Rep. of Germany ...... 280/756 |
| 3802520 | 1/1989 | Fed. Rep. of Germany . |
| 3822461 | 1/1990 | Fed. Rep. of Germany . |
| 3925515 | 1/1991 | Fed. Rep. of Germany . |
| 2203706 | 10/1988 | United Kingdom . |

Primary Examiner—Karin L. Tyson
Attorney, Agent, or Firm—Evenson, McKeown, Edwards & Lenahan

[57] ABSTRACT

A motor vehicle rollover protection device is provided at each side of the vehicle and can be raised out of a lowered position in one plane into a supporting position and fixed in this supporting position. At least one of the rollover protection devices is arranged to extend approximately in the longitudinal direction of the vehicle and on each of the two sides of a vehicle body. In the lowered position, the device is sunk into a vehicle side wall.

2 Claims, 1 Drawing Sheet

MOTOR VEHICLE ROLLOVER PROTECTION DEVICE

BACKGROUND AND SUMMARY OF THE INVENTION

The present invention relates to a rollover protection device for motor vehicles and, more particularly, to a rollover protection element arranged on sides of the vehicle so as to be raised out of a lowered position in one plane into a supporting position where it is fixed.

German Patent No. 3,925,515 shows motor vehicles without a fixed roof equipped in the back with a rollover bar on which the vehicle rolls if it turns over. The rollover bar is further supported on the bonnet or on a windscreen frame of reinforced design, and thereby preserves the passenger compartment to the greatest possible extent and reduces the possibilities of injury to a vehicle occupant if the vehicle turns over. In order to guarantee support of the vehicle weight, however, the rollover bar should actually be placed within the passenger compartment, near to the vehicle occupants. Since this cannot always be achieved, for example for reasons of space, the rollover bar in the back, with its locking mechanism, and the support in the front zone must be of particularly rigid design.

To avoid impairing the appearance of the vehicle due to the rollover bar, it is also known to lower the rollover bar below the lateral edge of the vehicle and to move it into its operative position projecting above the said edge only as desired or as required. The drive necessary for this purpose and the approximately vertical orientation of the rollover bar behind rearward-sloping seats leads to problems in the accommodation of the rollover bar since, in the case of sporty-looking vehicles, the passenger compartment and the luggage space situated there behind are scanty and are severely limited in addition by a rollover bar fixed at that point. Arranging the rollover bar in the transverse direction of the vehicle can even make it impossible to place any rear seating behind these front seats.

An object on which the present invention is based is to fix an extendable rollover protection element such as a rollover bar in the central zone of a motor vehicle and as far as possible outside the passenger compartment.

This object has been achieved by providing that the rollover protection device extends approximately in the longitudinal direction of the vehicle and is arranged on each of the two sides of the vehicle body so that in the lowered position it is sunk in a side wall of the vehicle.

The rollover protection devices of the present invention aligned in the longitudinal direction of the vehicle on both sides of the vehicle body make good use of the available space in the vehicle side wall outside the passenger compartment. At the same time, the vehicle sides can be reinforced by the rollover protection element and by its guides against a side impact. If the rollover protection element is configured as a rollover bar, it is possible either to provide a pivotable rollover bar with a raisable limb that can be locked to the vehicle side wall via a known mechanism, or to insert into the vehicle side wall a rollover bar which can be raised parallel to the vehicle side wall.

In order to counteract buckling of the rollover bar in the transverse direction of the vehicle in the case of large loads during a vehicle overturn, the rollover bar can be provided with additional limbs which project in the transverse direction of the vehicle from its central piece extending in the longitudinal direction of the vehicle and are supported on the same vehicle side wall.

Other objects, advantages and novel features of the present invention will become apparent from the following detailed description of the invention when considered in conjunction with the accompanying drawings.

DETAILED DESCRIPTION OF THE DRAWING

Figure 1B:
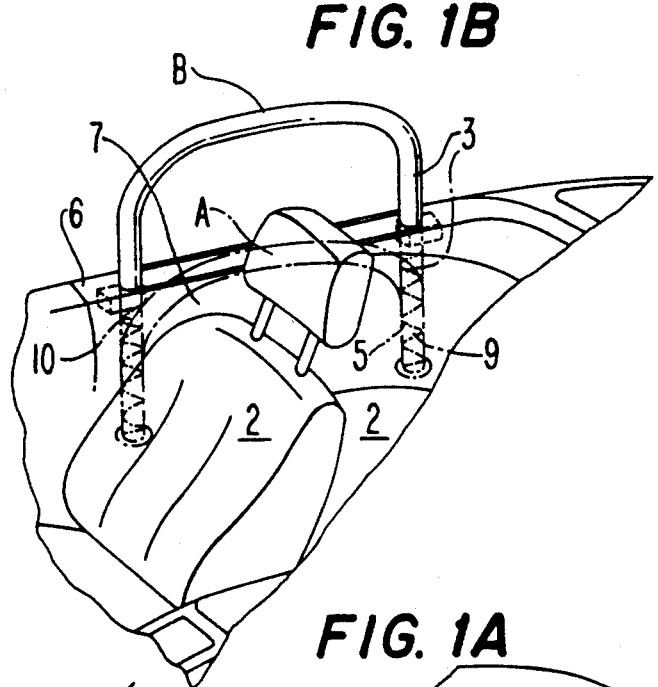
FIG. 1B is a partial perspective view of a right side of a convertible motor vehicle having a rollover protection device with parallel limbs according to another embodiment of the present invention.
Figure 1A:
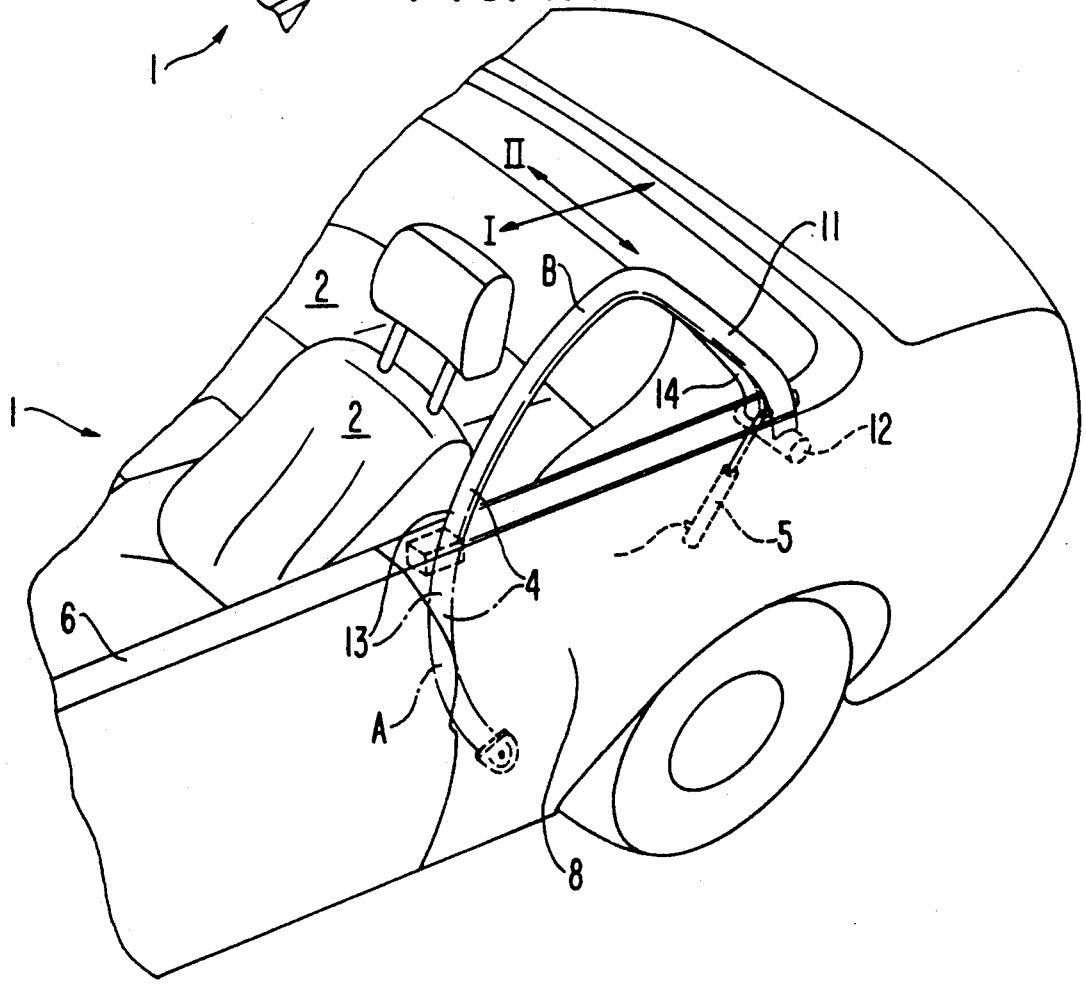
FIG. 1A is a partial perspective view of a left side of a convertible motor vehicle having a pivotable rollover protection device according to the present invention.

To protect the vehicle occupants (not shown) on one of the seats 2 if the vehicle 1 turns over, the vehicle is provided with two curved rollover bars 3, 4 which span a plane and, as desired and/or as required, can be raised in this plane above a lateral edge 6 of the vehicle 1, out of a lowered position A shown in phantom lines into a supporting position B, by a known type of drive 5 which is only shown schematically. The two rollover bars 3, 4 are arranged on both sides of a vehicle body and aligned approximately in the longitudinal direction I of the vehicle. In the lowered position A, the bars 3, 4 are sunk in a vehicle side wall 7, 8 respectively.

Two different types of rollover bars 3 and 4 are depicted in the drawings to show two different embodiments of the invention. In a particular vehicle the two bars will be of the same type. Rollover bar 3 is U-shaped and can be displaced vertically with its lateral limbs 9 and 10 in the vehicle side wall 7 and parallel to the latter by the drive 5. When the supporting position B of the rollover bar 3 is reached, the ends of the limbs are locked to the vehicle side wall 7 via a known mechanism.

Rollover bar 4 has a V-shaped bend and is fixed on the vehicle side wall 8 by a limb 11 such that it can pivot in a bearing 12 about an axis extending in the transverse direction II of the vehicle. After the V-shaped rollover bar 4 has been raised, the other limb 13 is locked to the vehicle side wall 8 in a known manner. A further limb 14 projects from this rollover bar 4 in the transverse direction II of the vehicle. The free end of this limb 14 is supported on the same vehicle side wall 8 in the bearing 12 and prevents the first limbs 11 and 13 from buckling in the transverse direction II of the vehicle.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A rollover protection device in a convertible vehicle, comprising two rigid rollover bars each assigned to one side of the convertible vehicle and having limbs arranged to be movable upward from a lowered position in lateral walls of the vehicle in one plane into a supporting position and fixed in the supporting position and sized to guarantee support of weight of the vehicle in the event of turnover, wherein the two rollover bars are arranged on opposite sides of the convertible vehicle such that the limbs span a plane extending approximately in a longitudinal direction of the vehicle and in the lowered position are sunk in the lateral walls so as to be flush with a lateral edge of a side wall of the vehicle, and one limb of each rollover bar is fixed on the vehicle side wall in a bearing such that the fixed limb is pivotable about an axis extending in a transverse direction of the vehicle, and another limb is lockable to the vehicle side wall when the supporting position is reached.

2. The rollover protection device according to claim 1, wherein a further limb projects from each rollover bar in the transverse direction and has a free end supported on the vehicle side wall to prevent the other limbs from buckling in the transverse direction of the vehicle.

* * * * *